US Patent Number: 4,504,459
Stothers
Date of Patent: Mar. 12, 1985

[54] EXTRACTION OF ELEMENTAL SULPHUR FROM SULPHUR COMPOUND GASES

[76] Inventor: William R. Stothers, 48 Woodbrook Rd. SW., Calgary, Alberta, Canada, T2W 4M6

[21] Appl. No.: 512,554

[22] Filed: Jul. 11, 1983

[51] Int. Cl.$^3$ .......................... C01B 17/04; B01J 8/12
[52] U.S. Cl. ............................... 423/573 G; 423/230; 423/574 R; 422/171; 422/191; 422/216
[58] Field of Search ............... 423/DIG. 13, 224, 230, 423/573 G, 573 R, 574 R, 574 G, 576; 422/171, 172, 191, 216, 235

[56] References Cited

U.S. PATENT DOCUMENTS 2,767,062 10/1956 Duecker ............................ 423/576

FOREIGN PATENT DOCUMENTS 44259 1/1982 European Pat. Off. ............ 423/224

Primary Examiner—Earl C. Thomas
Assistant Examiner—Jeffrey E. Russel
Attorney, Agent, or Firm—Stanley G. Ade

[57] ABSTRACT

Hydrogen sulphide is extracted from a supply gas as elemental sulphur using a reactor comprising a vertical cylinder containing a downwardly moving bed of catalyst. Catalyst extracted at the bottom is elevated by a stream of the supply gas in an unheated condition and is cooled by contact with the gas and subsequently by contact with supply air to a temperature of the order of 150° F. for injection into the top of the cylinder. The cylinder is free from restrictions to catalyst movement. A plurality of slip stream condensers arranged seriatim along the length of the cylinder each act to extract 60% of the total gas flow upwardly in the cylinder and return the extracted gas downstream of the next adjacent extraction point so that the whole of the gas is extracted into one or more condensers for condensation of the sulphur formed on the catalyst.

15 Claims, 3 Drawing Figures

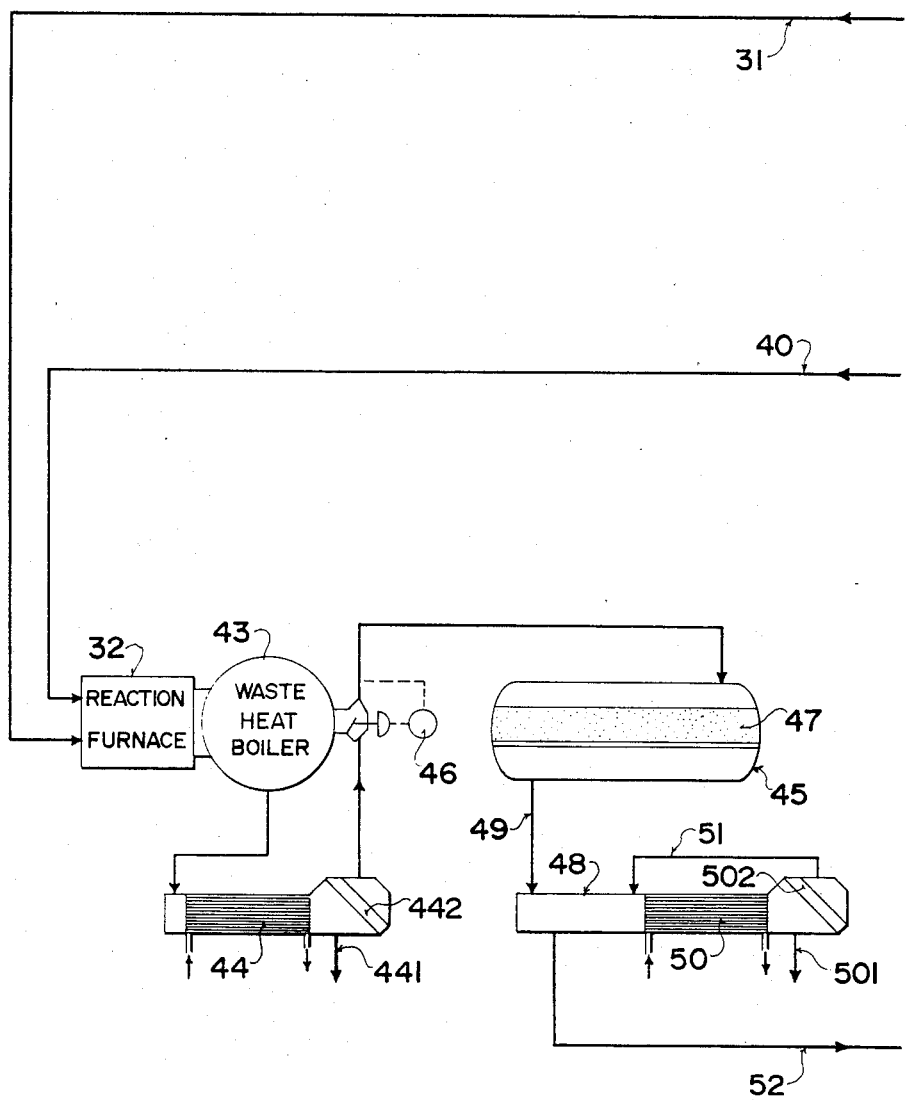
FIG. IA

EXTRACTION OF ELEMENTAL SULPHUR FROM SULPHUR COMPOUND GASES

BACKGROUND OF THE INVENTION

This invention relates to the extraction of elemental sulphur from sulphur compound gases and particularly to the extraction of elemental sulphur from the hydrogen sulphide present in natural gas both for the purpose of obtaining sulphur and for the purpose of disposing of the hydrogen sulphide.

Hydrogen sulphide is often a component of natural gas as extracted from the field and for environmental reasons this can not be allowed to remain in the natural gas when it is supplied to consumers. It has therefore been a practice for many years to extract the hydrogen sulphide and to dispose of the hydrogen sulphide by reacting it with sulphur dioxide to produce elemental sulphur and water. This reaction takes place at a practically acceptable extraction level only in the presence of a catalyst such as finely divided alumina.

In recent years it has been found that higher extraction levels can be obtained by using catalyst at a temperature less than the dew point of sulphur. This causes the sulphur to condense onto the catalyst thus gradually poisoning the catalyst. It is necessary therefore periodically to regenerate the catalyst. This regeneration can be carried out by applying the hot supply gases of hydrogen sulphide and sulphur dioxide to the catalyst at a temperature above the dew point so the sulphur is evaporated off the catalyst for collection in condensers downstream of the catalyst. Thus systems have been set up using two or more beds of the catalyst in which one bed is being regenerated by the evaporation and collection of the sulphur while another bed is at a lower temperature so that the reaction takes place at a high level of extraction. Periodically, typically daily, the beds are reversed in order relative to the path of the gases so that the first bed is used for the reaction while the second is being regenerated.

U.S. Pat. No. 2,767,062 (Duecker) and U.S. Pat. No. 3,749,762 (Montgomery) discloses in FIGS. 1 and 2 a system of this type. The system has a number of considerable disadvantages in that while the process is nominally a continuous process there is a considerable time of the order of 1½ minutes in which switching is taking place in which the recovery is very poor and hence sulphur gases are emitted to the atmosphere and the longer period of time where the beds of catalyst are at the wrong temperature and hence operating inefficiently.

In addition there is considerable disadvantage in that the beds must be of a very large size in order to accommodate the amount of gas and in a practical example for a plant having 250 LTD capacity requiring 99% sulphur recover the beds in total may amount to 600 tons (545 tonne) with consequent high capital cost in installation.

Furthermore, the switching between the beds causes a heat/cool cycle in the ducting and in the supports for the beds with consequent expansion and contraction problems which must be accommodated at considerable expense in the design.

A yet further disadvantage is that the actual switching mechanism provided by valves are individually of considerable expense and a number of such valves are required in the construction. In practical examples three or more beds are used rather than the two beds proposed by Duecker with each bed being associated with its own condenser in order to reduce the numbers of valves used as in U.S. Pat. No. 3,749,762. This requirement to associate a particular condenser to a particular bed means that the condenser has to be designed in an attempt to accommodate the different parameters of the different functions thus reducing the efficiency and increasing the capital cost by the necessary compromise.

Duecker, in FIG. 4, also proposes a continuous system using two moving beds of the catalyst so that the catalyst moves from the reactor directly to the regenerator in a continuous stream. This arrangement has a number of problems and certainly has never become accepted in the field and it is believed that it has never been practically manufactured.

SUMMARY OF THE INVENTION

It is one object of the invention to provide a process for extracting sulphur compound gases in the form of elemental sulphur using the above catalytic arrangement in which a moving bed of the catalyst is used.

According to a first aspect of the invention therefore this is provided a process for the extraction of sulphur compound gases from a supply gas in the form of elemental sulphur, the process comprising forming a downwardly moving bed of catalyst in a container, introducing catalyst into the container at the top of the bed at a temperature less than the dew point of sulphur, with drawing catalyst from the bottom of the bed, injecting the supply gas into the container at the bottom of the bed at a temperature higher than the boiling point of sulphur such that the gases at the top of the bed react on the catalyst to form elemental sulphur which condenses on the catalyst and such that the gases at the bottom of the bed vaporize and strip the condensed elemental sulphur from the catalyst, withdrawing gases from the container at a plurality of positions spaced along the height of the bed, condensing and extracting elemental sulphur from said withdrawn gases and returning said gases to the bed.

According to a second aspect of the invention there is provided an apparatus for engaging a fluid with a moving bed of catalyst comprising a container, means for withdrawing catalyst from the bottom of the container and for elevating the catalyst for return to the top of the container, fluid inlet means at the bottom of the container, fluid outlet means at the top of the container, and a plurality of condensers each including means for extracting fluid from the bed and means for returning the fluid to the bed at a position downstream of said withdrawing means, the respective withdrawing means of said condensers being spaced along the bed.

According to a third aspect of the invention there is provided a process for extracting from a supply gas sulphur compound gases in the form of elemental sulphur, the process comprising forming a downwardly moving bed of catalyst, withdrawing catalyst from the bottom of the bed, cooling the withdrawn catalyst to a temperature less than 250° (121° C.) F., introducing the cooled catalyst to the top of the bed, injecting the supply gas into the container at the bottom of the bed at a temperature higher than the boiling point of sulphur such that the gases at the top of the bed react on the cooled catalyst to form condensed elemental sulphur and such that the gases at the bottom of the bed heat the catalyst to evaporate and strip the condensed elemental sulphur from the catalyst, withdrawing gases from the bed, condensing and extracting elemental sulphur from said withdrawn gases and returning said gases to the bed.

According to a fourth aspect of the invention there is provided a process for extracting from a supply gas sulphur compound gases in the form of elemental sulphur, the process comprising forming a downwardly moving bed of catalyst, withdrawing catalyst from the bottom of the bed, contacting the withdrawn catalyst with the supply gas in an unheated condition to cool the catalyst, introducing the cooled catalyst to the top of the bed, injecting the supply gas into the container at the bottom of the bed at a temperature higher than the boiling point of sulphur such that the gases at the top of the bed react on the cooled catalyst to form condensed elemental sulphur and such that the gases at the bottom of the bed heat the catalyst to evaporate and strip the condensed elemental sulphur from the catalyst, withdrawing gases from the bed, condensing and extracting elemental sulphur from said withdrawn gases and returning said gases to the bed.

According to a fifth aspect of the invention there is provided an apparatus for the extraction from a supply gas of sulphur compound gases in the form of elemental sulphur comprising a container for receiving a downwardly moving bed of catalyst, means for withdrawing catalyst from the bottom of the bed, means for elevating the withdrawn catalyst to the top of the bed, means for introducing the elevated catalyst into the top of the bed, means for injecting the supply gas into the container at the bottom of the bed, means for burning the supply gas prior to introduction into the bottom of the container, condenser means including means for extracting gases from the container and for returning said extracted gases to the container, and means for contacting the withdrawn catalyst with the supply gas in an unheated condition for cooling said catalyst.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIGS. 1 and 1A together provide a schematic layout of a sulphur extraction plant according to the invention.

In the drawings like characters of reference indicate corresponding parts in the different figures.

DETAILED DESCRIPTION

Figure 1:
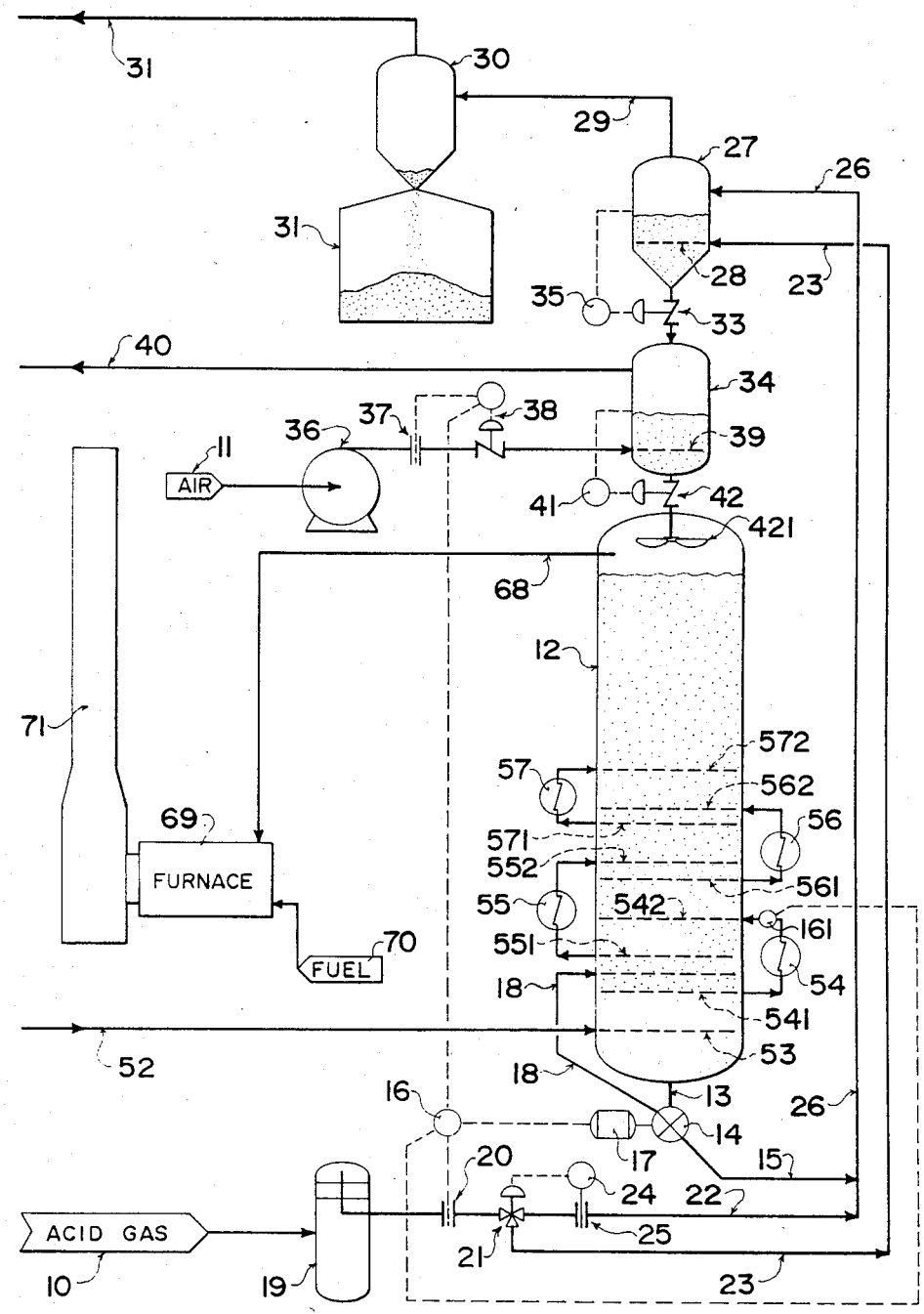

The apparatus is indicated in the drawings generally in a schematic manner since the structure of most of the individual elements is known to one skilled in the art and also the chemical processes involved are known to one skilled in the art. Basically the apparatus acts to extract sulphurous gases in the form of elemental sulphur. The supply of gas is mainly in the form hydrogen sulphide with a considerable proportion also of carbon dioxide and some water vapour. As is known, the acid gas is extracted from natural gas or other hydro-carbon supply with the extraction plant being omitted from the drawing as it is well known. The acid gas can also include some carbonyl sulphide (COS) and some carbon disulphide ($CS_2$) in relatively small amounts.

The chemistry of the extraction process is known but fundamentally is based upon the equation:

$$2H_2S + SO_2 \rightleftharpoons 3/N\ S_N + 2H_2O \qquad (1)$$

$$H_2S + 3/2O_2 \rightleftharpoons H_2O + SO_2 \qquad (2)$$

The base ingredients for the process are therefore the acid gas and also a supply of oxygen as provided by an air supply. The acid gas supply is indicated schematically at 10 and the air supply indicated schematically at 11.

The main chemical reaction and also the extraction of the elemental sulphur takes place within a container 12. The container 12 is cylindrical, typically of the order of 45 feet (13.7 meters) in height and 14 feet (4.3 meters) in diameter for a 250 LTD (long tons per day) plant (225 tonnes per day) and supports a moving bed of catalyst which loosely fills the whole container and is continually moving downwardly within the container toward an outlet schematically indicated at 13. The catalyst can be of various well known types but perhaps the most convenient is alumina which is readily available and provides the necessary large surface area for the chemical reactions. The catalyst is divided to a grain size of the order of 0.3 centimeters (4 to 6 mesh) but the size can be varied in accordance with known parameters.

The outlet 13 is provided centrally of the container 12 which is of a cylindrical form of substantially constant diameter. The outlet 13 communicates with a rotary valve 14 which provides a plurality of compartments moving past the outlet 13 so as to be gradually filled by the catalyst and then moved from the outlet 13 to a supply pipe 15 as the valve 14 rotates. The rate of rotation of the valve 14 is controlled by a motor 17 driving the rotary valve 14. The rate of rotation of the valve 14 controls and rate of movement of the catalyst within the container 12. A vent pipe 18 communicates any gas exiting from the outlet 13 into the valve 14 back into the container 12.

The acid gas from the supply 10 is communicated to a vertical scrubber 19 which of conventional construction and from the scrubber via an orifice meter 20 to a flow splitting valve 21. The valve 21 splits the flow of acid gas into a first path 22 and a second path 23 in proportions contolled by a flow control 24 in dependence upon measurements from a further orifice meter 25. Gas from the pipe 22 is communicated to a vertical stand pipe 26 which passes the end of the catalyst supply pipe 15. The gas travelling through the vertical stand pipe 26 thus acts to lift catalyst from the pipe 15 to a position above the top of the container 12. At the top of the pipe 26, the pipe communicates with a cyclone separator 27 in which the gas is separated from catalyst in known manner. Gas from the path or pipe 23 is communicated to the bottom section of the cyclone separator 27 so this gas also passes through the catalyst and is separated from the catalyst in the separator 27.

Although not illustrated it will be apparent that the pipe 26 exits into the cyclone separator in tangential manner so that the gas and catalyst swirl around within the cyclone separator with the gas rising to the top of the separator and the catalyst falling to the bottom. The gas from the pipe 23 is injected through a perforated supply pipe 28 into the bottom section of the cyclone separator so that as the catalyst is falling from the upper part the gas rises through the catalyst to an exit pipe 29 at the top of the separator 27. The pipe 29 communicates with a further cyclone separator 30 which acts to separate any dust or very small particles from the gas exiting from the separator 27 with the dust being collected in the chamber 31. Dust free gas from the separator 30 is communicated via a pipe 31A to a reaction furnace 32.

Catalyst collecting in the bottom of the separator 27 is communicated through a valve 33 to a further chamber 34. The level of catalyst within the separator 27 is maintained at a desired position by a level control device 35 which acts to measure the position of the level and to control the opening of the valve 33 to maintain that level.

Within the container 34, the catalyst falls through an upwardly rising air supply controlled from the supply 11 through a blower 36, orifice meter 37 and flow control valve 38. The air is injected into the container 34 through a perforated inlet 39 so the air permeates through the falling catalyst to an air outlet 40 adjacent the top of the container 34.

The container 34 also includes a level control valve 41 of similar construction to the control 35 so as to maintain a level of catalyst within the container 34 by controlling the opening of a valve 42. The valve 42 controls the supply of catalyst from the container 34 onto a spreader 421 into the top of the container 12 and hence it will be apparent that the supply pipe 26, separator 27, container 34 and container 12 provide a continuous path for the catalyst. The catalyst continuously cycles around the path at a rate determined by the various valves and particularly the valve 14.

Air from the outlet 40 of the chamber 34 is communicated to the furnace 32 as a supply gas to the furnace in conjunction with the acid gas from the line 31. In the furnace the gases are burned and the exhaust gases are communicated through a waste heat boiler 43 to a first condenser 44. From the first condenser the gas is passed to a container 45 via a temperature control valve 46 which acts to measure the temperature of the gases passing to the container 45 and to ensure that they are maintained at a sufficiently high temperature by the by-passing of a second pass of the waste heat boiler 43 should the temperature fall below a preset level.

The container 45 includes a stationary bed 47 of the same catalyst as in the container 12. The container 45 is of a conventional construction and as is well known is arranged to support the bed on a plurality of grids extending horizontally along the container. From the container 45 the exhaust gas is communicated to a heat exchanger 48 along a pipe 49 and from the heat exchanger 48 to a condenser 50. From the condenser 50 the gas passes along a further pipe 51 back to the heat exchanger 48 and thence along a pipe 52 to an inlet 53 of the container 12.

The condensers 44 and 50 of are conventional construction and comprise a plurality of tubes extending horizontally which pass through a cooling water jacket so as to cool the gases and condense out any elemental sulpher which runs to the bottom of the condenser for extraction at an outlet schematically indicated at 441, 501 respectively. A mesh screen 442, 502 is arranged diagonally across a plenum chamber to extract any solids or liquids transported in the gas with the gas outlet from the condenser lying downstream of the mesh screen.

Figure 2:
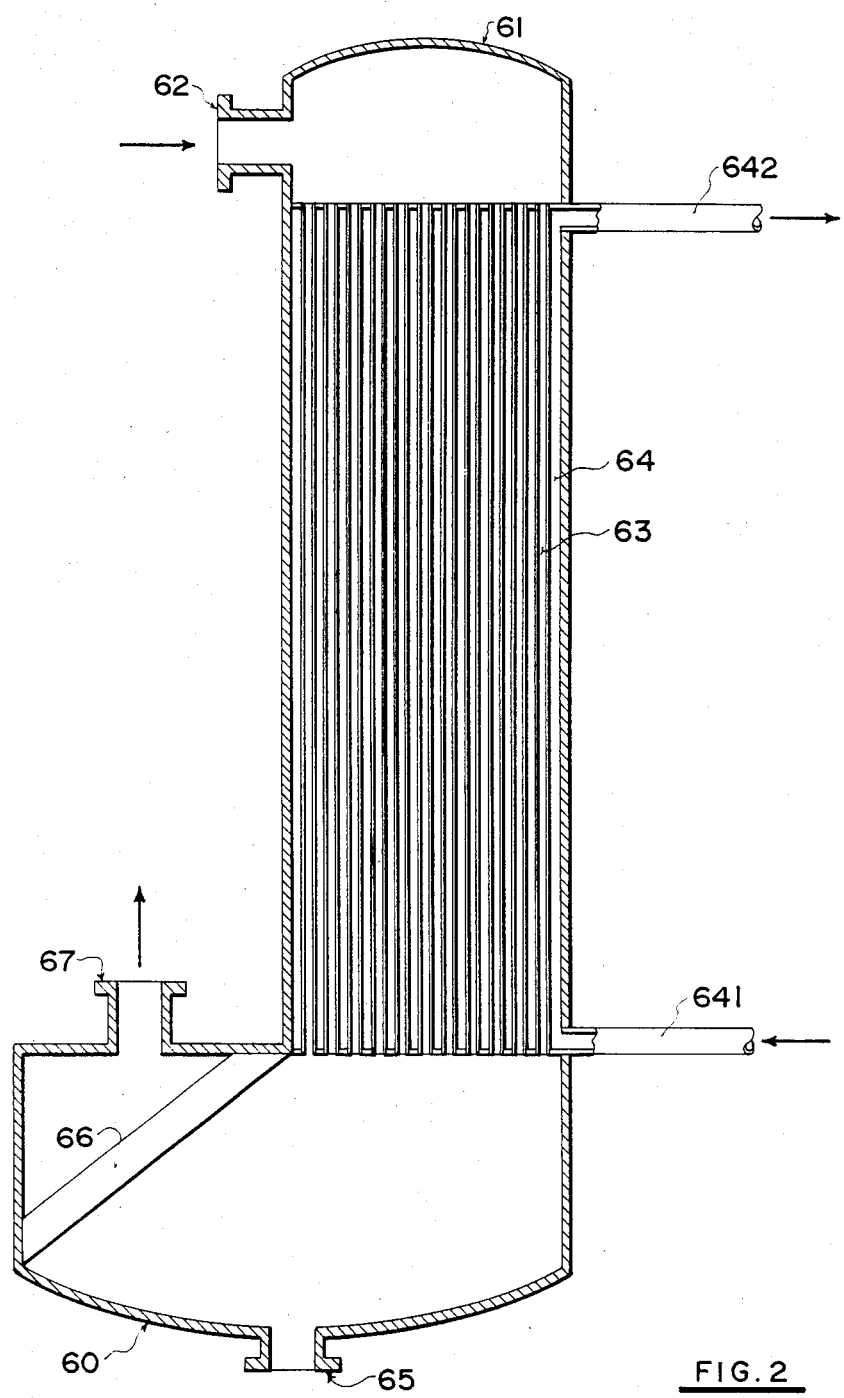
FIG. 2 is a cross-sectional view through one of the condensers 54 to 57 of FIG. 1.

Alongside the container 12 are provided four slip stream condensers 54, 55, 56 and 57. Each slip stream condenser is connected to a gas outlet 541 551, 561 571 respectively for extracting gas from the container 12 and a gas inlet 542 552, 562 572 respectively for injecting gas back into the container 12. It will be noted that the gas outlet 551 to the condenser 55 lies upstream of the gas stream relative to the inlet 542 from the condenser 54. Similarly, the outlet to each next downstream condenser is upstream of the inlet from the respective condenser. The structure of one of the condensers is shown in cross-section in FIG. 2 and comprises a container with a plenum chamber 60 at one end and a second plenum chamber 61 at the top end. The outlet 541 is connected to the plenum chamber 61 via a duct section 62 so that gas enters the plenum chamber 61 from the container 12. Between the chambers 60 and 61 are arranged a plurality of vertical tubes 63 which pass through a water cooling bath 64 with inlet and outlet 641, 642. Thus gas entering the plenum chamber 61 is cooled through the tubes 63 so that sulphur is condensed from the gas and collected in the plenum chamber 60 for exit through a sulphur collecting outlet 65. A mesh screen 66 prevents liquids or solids from escaping from the plenum chamber 60 to a duct 67 communicating with the inlet 542 in the container 12.

Gas passing upwardly in the container 12 to the top of the container 12 is extracted therefrom via an outlet pipe 68 for communication to a furnace 69 fired by a fuel supply 70 in which any remaining combustible gases are burnt before release to the atmosphere through a chimney stack 71.

In operation acid gas containing a large proportion of hydrogen sulphide is communicated to the valve 21 from the supply 10. The valve 21 is operated to extract from the supply sufficient gas to raise catalyst in the pipe 26 with any remaining gas passing through the pipe 23. This flow splitting arrangement at the valve 21 ensures that the correct amount of gas is extracted for raising the catalyst in the pipe 26 regardless of the total flow of gas from the supply 10. The amount of gas employed to raise the catalyst in the pipe 26 is chosen such that the velocity of gas is sufficient to raise the catalyst without raising it at a speed at which it is smashed by impact at the top of the pipe 26. In practice the velocity of gas can be of the order of 20 feet per second so the catalyst velocity between two and fourteen feet per second depending upon its diameter. The finer catalyst will travel faster but is less susceptible to mechanical damage. Catalyst speeds will also increase with higher ratios of catalyst to acid gas. It is important to minimize catalyst speed to reduce pipe erosion and catalyst fracturing yet all the catalyst must be lifted so it does not clog the elevator pipe 26.

The amount of gas from the supply 10 is measured at the orifice meter 20 and this amount is used to calculate the amount of air needed to complete the chemical reactions as explained hereinafter. In addition the rate of flow of air and catalyst necessary for the reactions is calculated and these rates used to activate the control valve 38 of the air supply and the motor 17 of the flow valve 14 of the catalyst supply. The control of these rates is exercised by a control device schematically indicated at 16. In addition an air demand analyzer 161 is connected to the gas stream 542. As a rule of thumb, the catalyst mass circulation rate is designed to be equivalent to the air circulation rate or more accurately to be this rate times the specific heat of air divided by the specific heat of alumina; however, in practice, it is better to err on the low side than on the high side. Also, it is important that the circulation rate of catalyst be controlled to be in proportion to the flow rate of air for optimum catalyst temperature control. It is standard practice in sulphur plant design to control the flow rate of air to be in proportion to the flow rate of acid gas and it is standard practice in sub-dewpoint sulphur plants to correct the ratio of air to acid gas using an air demand analyzer located upstream of the sub-dewpoint converter. The air demand analyzer indicated at 161 attempts to maintain the ratio of H2S:SO2 at the desired 2:1.

Approximately one third of the acid gas stream under normal conditions is used to pneumatically lift the catalyst via the pipe 26.

The contact of the acid gas which is approximately at ambient temperature with the catalyst acts to cool the catalyst. This cooling is further enhanced by the contact of the remainder of the acid gas from the pipe 23 within the separator 27. The contact of the acid gas on the catalyst also acts to strip any remaining sulphur from the catalyst to prevent the sulphur forming sulphate compounds on the catalyst when the catalyst comes into contact with oxygen. Sulphate compounds poison the catalyst in a substantially unrecoverable manner and hence can not be allowed to occur.

In the container 34 the cooled catalyst is further cooled by contact with air from the supply 11. This cooling is obtained by direct contact between the air and the catalyst and hence can be obtained in a most efficient manner without the necessity for a heat exchange medium separating the air from the catalyst. The contact of the air with the catalyst can occur without the danger of the formation of sulphate compounds in view of the previous extraction of any sulphur from the catalyst by the acid gas. Furthermore the oxygen or air acts to trip any remaining acid gas from the catalyst so as to avoid acid gas being extracted from the top of the container 12 through the pipe 68. Thus the only gas escaping through the pipe 68 is the exhaust gas rising through the container 12 and also some air escaping into the container 12 from the container 34, which escape will not cause any further polution but will merely assist with the combustion in the furnace 69.

The air and acid gas supplied to the furnace 32 are burnt in the furnace. Initially the hydrogen sulphide and oxygen react to form water vapour and sulphur dioxide according equation 2 above and subsequently the sulphur dioxide further reacts with the hydrogen sulphide to form elemental sulphur and further water vapour according to equation 1 above. It is not possible to obtain completion of the reaction of equation 1 within the furnace and therefore a proportion of hydrogen sulphide and sulphur dioxide remain within the exhaust gases from the furnace together with water vapour, elemental sulphur in vapour form, some carbonyl sulphide and some carbon disulphide together with a proportion of carbon dioxide.

The reaction furnace 32, waste heat boiler 43, first condenser 44, hot gas by-pass 46, first converter 45 and second condenser 50 are very similar in construction to those found in a traditional Claus sulphur plant.

The exhaust gas is cooled in the waste heat boiler 43 and also in the condenser 44 with some of the sulphur being extracted by the condenser 44.

In the stationary bed 47 in the converter 45, a first reaction occurs between the hydrogen sulphide and sulphur dioxide at a temperature of approximately 650° F. (343° C.). This acts to extract some of the hydrogen sulphide and sulphur dioxide into elemental sulphur which is at a sufficiently high temperature to remain in vapour form and hence to be extracted from the converter 45 to the gas/gas heat exchanger 48. In addition the high temperatures within the bed 47 act to hydrolize the carbonyl sulphide and also the carbon disulphide to hydrogen sulphide and carbon dioxide which also exits to the heat exchanger 48.

The exhaust gas entering the heat exchanger 48 is cooled to approximately 500° F. (260° C.) at which temperature it enters the condenser 50 to yet further condense out elemental sulphur from the exhaust gases.

The gas re-entering the heat exchanger 48 is then reheated from approximately 340° F. (171° C.) to a temperature of the order of 500° F. (260° C.) at which temperature it enters the container 12 through the inlet 53.

The final and most important extraction of sulphur occurs within the container 12 and also the slip stream condensers 54 through 57. At the bottom of the container 12, the entering gas of the order of 500° F. is above the boiling point of sulphur and hence any elemental sulphur condensed on to the catalyst is vaporized off the catalyst and carried in the rising exhaust gas up the container 12.

The gas outlet 541 to the condenser 54 is formed of a perforated duct with the duct size, perforation size and number of perforations chosen such that the catalyst cannot escape but that of the order of 60% of the gas rising in the container 12 is extracted at that point. Thus approximately 60% of the gas passes through the slip stream condenser 54 and is returned through the inlet 542 from that condenser. The extracted gases are cooled in the condenser with any condensed sulphur being collected from the condenser.

Upstream of the inlet 542 from the condenser 54 is positioned the outlet 551 to the condenser 55. The perforations and duct size of the outlet 551 of the condenser 55 together with the spacing between the outlet 551 in relation to the inlet 541 and outlet 542 are arranged such that the whole of the remainder of the gases is extracted into the condenser 55 together with a proportion of the gas injected through the inlet 542 from the condenser 54.

With 60% as the figure extracted at the first gas outlet 541, the remaining 40% is extracted at the second gas outlet 551 with 20% drawn back from the first gas inlet 542 to the second gas outlet 551. This figure of 60% can be varied in accordance with the requirements but this particular relationship whereby substantially the total of the remaining gas is extracted at the second outlet 551 and some drawn back from the first inlet 542 is a particularly important arrangement with enables the maximum condensation to be obtained in a minimum number of condensers. In addition this arrangement allows the catalyst bed to be unrestricted by valves since it prevents or substantially prevents any of the gas passing through the container without being extracted to a condenser.

The inlet and outlet tubes 541, 542 etc. while extending across the bed do not provide a restriction to flow in the sense that the flow is not required to pass through a reduced orifice thus interfering with the flow of any coagulated mass of the catalyst.

This contrasts with a known arrangement where the only way of ensuring that some of the gas does not pass through without entering a condenser is to valve to gases to ensure that they pass through the condenser. Such valving of course requires that the catalyst also passes through the valve in the opposite direction which provides a narrow restriction or the flow of catalyst.

The inlets to and outlets from the remaining slip stream condensers 56 and 57 are arranged symmetrically to the first with the 60%, 40%, 20% relationship being maintained between each and the next subsequent downstream condenser.

As the hot gases rise in the catalyst, all the sulphur which has condensed on the catalyst is stripped from the catalyst and condensed out in the slip stream condensers 54 through 57. In the upper level of the container 12 the temperature of the gases is reduced gradually by contact with the cooled catalyst until the temperature is below that of the boiling point of sulphur. As soon as that temperature is reached the catalyst acts in a second mode to support the reaction wherein the hydrogen sulphide and sulphur dioxide react to form water vapor and elemental sulphur as in reaction number 1 above. Thus the elemental sulphur condenses on the catalyst in the upper section of the container 12 with the catalyst then moving into the lower section for the sulphur to be stripped and collected in the condensers 54 through 57. The action of the cooling acid gas and cooling air on the catalyst prior to entering the container 12 acts to cool the catalyst down to a temperature less than 300° F. (149° C.) and preferably in the range 150° F.) (66° C.) to 250° F. (121° C.). The most favourable conditions for obtaining the maximum reaction of the hydrogen sulphide and sulphur dioxide is the temperature of the order of 150° F. and this temperature can be achieved by the apparatus as described. In this way less than 0.5% of the sulphur remains in the gases extracted at the outlet 68 of the container 12 for combustion in the furnace 69 and release to the atmosphere as sulphur dioxide. The catalyst temperature could be reduced to within a few degrees of ambient temperature by locating the air blower, 36, on the outlet of vessel 34.

The bed of catalyst in the container 12 is a moving bed and hence can support a velocity of gas rising in the container 12 considerably greater than a stationary bed. Such a velocity of rising gas in the container 12 before the outlet 41 and after the inlet 572 may lie in the range one foot per second (30 cms/sec) to seven feet per second (2.1 m/sec) provided it is insufficient to raise the catalyst in the container 12. Normally such a velocity would not be acceptable in a bed of catalyst since it would act to move the bed and thus provide access passages through the bed through which the gas would pass, by-passing most of the rest of the bed.

This use of a moving bed in the container 12 allows a considerable reduction in the amount of catalyst necessary for this reaction from approximately 300 tons (273 tonne) in a conventional system for 250 LTD using the Montgomery patent down to something of the order of 160 tons (145 tonne) within the containers 12, 34, 35, and 47.

In an alternative arrangement, not illustrated where the proportion of hydrogen sulphide in the supply gas is less than 12%, instead of burning the hydrogen sulphide in the furnace 32, some of the collected sulphur is burnt in that furnace with the hydrogen sulphide being supplied directly to the bottom of the container 12 together with the sulphur dioxide formed in the furnace 32. Such an arrangement is known to be used in certain circumstances and it would be apparent to one skilled in the art how to modify the apparatus as disclosed in relation to this modified process. In concentrations between 12% and 50% it is customary to supply some acid gas and/or air preheat prior to combustion in order to maintain a stable flame. Since the process of my invention adds some preheat to these streams, additional preheat would not normally be required unless the H2S concentration in the acid gas were less than 40%.

In an alternative arrangement (not shown) the diameter of the container 12 below the inlet 572 can be reduced to of the order of 9 feet (2.74 meters) in view of the reduced amount of gases flowing in the container due to the extraction to the slip-stream condensers. To avoid necking of the container to an increased diameter upstream of the outlet 541, the inlet of gases on the line 52 can be divided into two inlets 53, equally spaced on either side of the outlet 541 with 30% of the total injected upstream of the inlet 541 and 70% downstream thereof. 30% of the total stream will therefore be drawn back from the downstream inlet to the outlet 541 for passing through the slipstream condenser 54.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A process for the extraction of sulphur compound gases from a supply gas in the form of elemental sulphur, the process comprising forming a downwardly moving bed of catalyst in a container, introducing catalyst into the container at the top of the bed at a temperature less than the dew point of sulphur, withdrawing catalyst from the bottom of the bed, injecting the supply gas into the container at the bottom of the bed at a temperature higher than the boiling point of sulphur such that the gases at the top of the bed react on the catalyst to form elemental sulphur which condenses on the catalyst and such that the gases at the bottom of the bed vaporize and strip the condensed elemental sulphur from the catalyst, withdrawing from the container at a first withdrawal position and a second withdrawal position spaced along the height of the bed gases comprising less than the total flow of gases in the container, condensing and extracting elemental sulphur from said withdrawn gases and returning said gases to the bed at a first return position and a second return position, the container providing a path for flow of the bed of catalyst, which path is substantially free from valving arrangements restricting the flow of catalyst, wherein the first return position is downstream of the second withdrawal position and wherein the second withdrawal position is arranged relative to the first withdrawal position and first return position such that substantially the whole of the remainder of the gases not withdrawn at the first withdrawal position is withdrawn together with a proportion of the gases returned at said first return position.

2. A process according to claim 1 wherein the gas is introduced into the bottom of the bed such that substantially the whole of the sulphur is stripped from the catalyst.

3. A process according to claim 1 wherein of the order of 60% of the total gas flow is withdrawn at each position.

4. A process according to claim 1 wherein the temperature of the catalyst at the top of the bed lies in the range 150° to 250° F. (66° C. to 121° C.).

5. A process according to claim 1 including contacting the catalyst withdrawn from the bottom of the bed with the supply gas is an unheated condition whereby to cool the catalyst prior to introduction at the top of the bed.

6. A process according to claim 5 including transporting the catalyst from the bottom of the bed for return to the top of the bed in a stream of the supply gas and separating the catalyst from the supply gas.

7. A process according to claim 5 including contacting the catalyst with a gas containing oxygen in an unheated condition whereby to further cool the catalyst prior to introduction at the top of the bed.

8. A process according to claim 1 including contacting the catalyst withdrawn from the bottom of the bed with the supply gas in an unheated condition and subsequently contacting the catalyst with a gas containing oxygen in an unheated condition whereby the supply gas and the gas containing oxygen cool the catalyst prior to introduction of the top of the bed to a temperature less than 300° F.

9. A process according to claim 8 wherein the catalyst is cooled to a temperature less than 250° F. (121° C.).

10. An apparatus dfor engaging a fluid with a moving bed of catalyst comprising a container, means for withdrawing catalyst from the bottom of the container and for elevating the catalyst for return to the top of the container, fluid inlet means at the bottom of the container, fluid outlet means at the top of the container, and a first and a second condenser each including means for extracting fluid from the bed and means for returning the fluid to the bed at a position downstream of said withdrawing means, the respective withdrawing means of said condensers being spaced along the bed, said containers being free from valving arrangements restricting the flow of catalyst, the returning means of the first condenser being downstream of the extracting means of the second condenser, the extracting means of each condenser being arranged to extract less than the total amount of gases in the container, and the extracting means of the second condenser being arranged to extract from the container more gases than that left in the container by the first extraction means whereby to draw back in the container gases returned by the returning means of the first condenser.

11. A apparatus according to claim 10 wherein the container comprises a cylindrical body arranged with the axis of the cylinder substantially vertical and having a height greater than the transverse dimension thereof.

12. An apparatus according to claim 10 wherein the extracting means are arranged to extract of the order of 60% of the total gas flow.

13. An apparatus according to claim 10 including means for contacting the catalyst withdrawn from the bottom of the bed with the supply gas in an unheated condition whereby to cool the catalyst prior to introduction at the top of the bed.

14. An apparatus according to claim 10 including means for transporting the catalyst from the bottom of the bed for return to the top of the bed in a stream of the supply gas and separating the catalyst from the supply gas.

15. An apparatus according to claim 10 including means for contacting the catalyst with a gas containing oxygen in an unheated condition whereby to further cool the catalyst prior to introduction at the top of the bed.

* * * * *